United States Patent
Jersin et al.

(10) Patent No.: US 10,608,972 B1
(45) Date of Patent: Mar. 31, 2020

(54) MESSAGING SERVICE INTEGRATION WITH DEDUPLICATOR

(71) Applicant: LinkedIn Corporation, Mountain View, CA (US)

(72) Inventors: John Robert Jersin, San Francisco, CA (US); Benjamin John McCann, Mountain View, CA (US); Erik Eugene Buchanan, Mountain View, CA (US); Travis Nelson Hummel, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/274,418

(22) Filed: Sep. 23, 2016

Related U.S. Application Data (60) Provisional application No. 62/378,445, filed on Aug. 23, 2016, provisional application No. 62/382,155, filed on Aug. 31, 2016.

(51) Int. Cl.
*G06F 16/215* (2019.01)
*H04L 12/58* (2006.01)
*G06Q 10/10* (2012.01)
*G06Q 50/00* (2012.01)

(52) U.S. Cl.
CPC ............ *H04L 51/16* (2013.01); *G06F 16/215* (2019.01); *G06Q 10/1053* (2013.01); *H04L 51/36* (2013.01); *G06Q 50/01* (2013.01); *H04L 51/32* (2013.01)

(58) Field of Classification Search
CPC ......... H04L 51/16; H04L 51/36; H04L 51/32; G06Q 10/1053; G06Q 50/01; G06F 17/30303

USPC .......................................................... 709/206
See application file for complete search history.

(56) References Cited

U.S. PATENT DOCUMENTS

| | | |
|---|---|---|
| 6,009,199 A | 12/1999 | Ho |
| 6,026,417 A | 2/2000 | Ross et al. |
| 6,349,299 B1 * | 2/2002 | Spencer ................. G06Q 10/10 707/702 |
| 6,408,297 B1 | 6/2002 | Ohashi |
| 6,606,620 B1 | 8/2003 | Sundaresan et al. |
| 6,738,767 B1 | 5/2004 | Chung et al. |

(Continued)

OTHER PUBLICATIONS

"Amendment and Response to Non Final Office Action in U.S. Appl. No. 15/253,588", filed Aug. 7, 2018, 15 Pages.

(Continued)

*Primary Examiner* — Randy A Scott
*Assistant Examiner* — Berhanu Shitayewoldetadik
(74) *Attorney, Agent, or Firm* — Schwegman Lundberg & Woessner, P.A.

(57) ABSTRACT

Systems and methods for messaging service integration with a deduplicator are disclosed. In example embodiments, a server determines that a first user from among a set of users is composing a message to an entity using a first contact information of the entity. The server determines that a second user from among the set of users previously contacted the entity using a second contact information of the entity, the second contact information being different from the first contact information. The server provides for display, within a graphical user interface, an indication that the second user has previously contacted the entity.

18 Claims, 6 Drawing Sheets

(56) References Cited

U.S. PATENT DOCUMENTS

| | | | |
|---|---|---|---|
| 6,874,002 B1 | 3/2005 | Peleus et al. | |
| 7,065,483 B2 | 6/2006 | Decary et al. | |
| 7,092,956 B2 | 8/2006 | Ruediger | |
| 7,634,632 B2 | 12/2009 | Suponau et al. | |
| 7,836,041 B1 | 11/2010 | Jain et al. | |
| 7,912,842 B1* | 3/2011 | Bayliss | G06F 16/2471 707/749 |
| 7,930,322 B2 | 4/2011 | MacLennan | |
| 8,117,024 B2* | 2/2012 | Dane | G06F 17/271 704/9 |
| 8,306,942 B2 | 11/2012 | Chen et al. | |
| 8,370,349 B2 | 2/2013 | Quoc et al. | |
| 8,521,715 B1 | 8/2013 | Fearnow | |
| 8,543,904 B1 | 9/2013 | Karls et al. | |
| 8,577,814 B1 | 11/2013 | Wu et al. | |
| 8,620,836 B2 | 12/2013 | Ghani et al. | |
| 8,631,009 B2 | 1/2014 | Lisa et al. | |
| 8,799,235 B2 | 8/2014 | Kacher et al. | |
| 8,818,910 B1 | 8/2014 | Liu et al. | |
| 8,825,785 B1* | 9/2014 | Shah | G06Q 10/107 709/206 |
| 9,201,966 B2 | 12/2015 | Lundberg | |
| 9,268,997 B2* | 2/2016 | Sheth | G06K 9/00442 |
| 9,405,807 B2 | 8/2016 | Obernikhin et al. | |
| 9,430,742 B2 | 8/2016 | Zhang et al. | |
| 9,582,490 B2 | 2/2017 | Simard et al. | |
| 9,940,323 B2 | 4/2018 | Boyer et al. | |
| 10,120,937 B2 | 11/2018 | Peng | |
| 10,185,738 B1 | 1/2019 | Jersin et al. | |
| 10,318,600 B1 | 6/2019 | Lloyd et al. | |
| 10,467,299 B1 | 11/2019 | Jersin et al. | |
| 2004/0133855 A1 | 7/2004 | Blair et al. | |
| 2004/0139010 A1 | 7/2004 | Mcmichael et al. | |
| 2005/0125402 A1 | 6/2005 | Viola et al. | |
| 2005/0132002 A1* | 6/2005 | Creamer | G06Q 10/109 709/204 |
| 2006/0074999 A1 | 4/2006 | Chidlovskii | |
| 2006/0111975 A1* | 5/2006 | Fowler | G06Q 10/00 705/14.31 |
| 2006/0218111 A1 | 9/2006 | Cohen | |
| 2006/0265268 A1* | 11/2006 | Hyder | G06Q 10/063112 705/321 |
| 2007/0027672 A1 | 2/2007 | Decary et al. | |
| 2007/0073758 A1 | 3/2007 | Perry et al. | |
| 2007/0088601 A1* | 4/2007 | Money | G06Q 10/1053 705/321 |
| 2007/0174247 A1 | 7/2007 | Xu et al. | |
| 2008/0033996 A1 | 2/2008 | Kesari | |
| 2008/0065630 A1 | 3/2008 | Luo et al. | |
| 2008/0097781 A1 | 4/2008 | Clarke et al. | |
| 2008/0109294 A1 | 5/2008 | Williams et al. | |
| 2008/0140684 A1* | 6/2008 | O'Reilly | G06F 16/353 |
| 2008/0183488 A1* | 7/2008 | Vianello | G06Q 10/063112 705/7.14 |
| 2008/0229244 A1 | 9/2008 | Markus et al. | |
| 2008/0243885 A1* | 10/2008 | Harger | G06F 16/21 |
| 2008/0260122 A1* | 10/2008 | Conway | H04M 3/42221 379/112.01 |
| 2009/0182824 A1* | 7/2009 | Haynes | H04L 51/16 709/206 |
| 2009/0228297 A1 | 9/2009 | Mcgovern et al. | |
| 2009/0234669 A1 | 9/2009 | Fredericks | |
| 2009/0239467 A1* | 9/2009 | Gulin | G08B 5/36 455/41.2 |
| 2009/0287514 A1* | 11/2009 | West | G06Q 10/10 705/320 |
| 2009/0287657 A1 | 11/2009 | Bennett | |
| 2009/0319515 A1 | 12/2009 | Minton et al. | |
| 2010/0070448 A1 | 3/2010 | Omoigui | |
| 2010/0070499 A1* | 3/2010 | Gottsman | G06Q 10/10 707/736 |
| 2010/0121631 A1 | 5/2010 | Bonnet et al. | |
| 2010/0153289 A1 | 6/2010 | Schneiderman et al. | |
| 2010/0161566 A1* | 6/2010 | Adair | G06F 16/2462 707/690 |
| 2011/0004626 A1 | 1/2011 | Naeymi-rad et al. | |
| 2011/0022530 A1* | 1/2011 | Bogle | G06Q 10/00 705/321 |
| 2011/0145698 A1 | 6/2011 | Penov et al. | |
| 2011/0173145 A1 | 7/2011 | Wu et al. | |
| 2011/0184939 A1 | 7/2011 | Elliott | |
| 2011/0225139 A1 | 9/2011 | Wang et al. | |
| 2011/0231329 A1* | 9/2011 | Vianello | G01C 21/20 705/321 |
| 2011/0258193 A1 | 10/2011 | Brdiczka et al. | |
| 2012/0030126 A1 | 2/2012 | Mccagg et al. | |
| 2012/0041939 A1 | 2/2012 | Amsterdamski | |
| 2012/0096041 A1 | 4/2012 | Rao et al. | |
| 2012/0096523 A1* | 4/2012 | Ollila | G06Q 10/10 726/5 |
| 2012/0117465 A1 | 5/2012 | Carmel et al. | |
| 2012/0197835 A1 | 8/2012 | Costa et al. | |
| 2012/0246168 A1 | 9/2012 | Srivastava et al. | |
| 2012/0290950 A1* | 11/2012 | Rapaport | H04L 51/32 715/753 |
| 2012/0330708 A1 | 12/2012 | Khan | |
| 2013/0006975 A1 | 1/2013 | Li et al. | |
| 2013/0013489 A1 | 1/2013 | Kremen et al. | |
| 2013/0018871 A1 | 1/2013 | Mehta et al. | |
| 2013/0046704 A1* | 2/2013 | Patwa | G06Q 10/06 705/321 |
| 2013/0054598 A1* | 2/2013 | Caceres | G06F 16/215 707/737 |
| 2013/0117287 A1* | 5/2013 | Jagota | G06Q 10/06 707/755 |
| 2013/0166489 A1* | 6/2013 | Jagota | G06N 5/02 706/46 |
| 2013/0185218 A1* | 7/2013 | Hermsdorff | G06Q 10/1053 705/321 |
| 2013/0212185 A1* | 8/2013 | Pasquero | G06Q 10/10 709/206 |
| 2013/0254213 A1* | 9/2013 | Cheng | G06Q 50/01 707/748 |
| 2013/0275320 A1 | 10/2013 | Moore et al. | |
| 2013/0282814 A1 | 10/2013 | Marcucci et al. | |
| 2013/0325734 A1* | 12/2013 | Bixler | G06Q 10/1053 705/321 |
| 2014/0075299 A1 | 3/2014 | Ain et al. | |
| 2014/0101171 A1 | 4/2014 | Danielyan et al. | |
| 2014/0122355 A1 | 5/2014 | Hardtke et al. | |
| 2014/0122501 A1 | 5/2014 | Shen et al. | |
| 2014/0143165 A1 | 5/2014 | Posse et al. | |
| 2014/0164352 A1 | 6/2014 | Denninghoff | |
| 2014/0180770 A1* | 6/2014 | Baeck | G06Q 10/1053 705/7.39 |
| 2014/0258161 A1* | 9/2014 | Brown | G06Q 10/1053 705/321 |
| 2014/0279622 A1 | 9/2014 | Lamoureux et al. | |
| 2014/0297547 A1* | 10/2014 | Kruglick | G06Q 10/00 705/319 |
| 2014/0330734 A1* | 11/2014 | Sung | G06Q 10/1053 705/321 |
| 2014/0331124 A1 | 11/2014 | Downs et al. | |
| 2015/0006422 A1 | 1/2015 | Carter et al. | |
| 2015/0081578 A1* | 3/2015 | McLaughlin | G06Q 10/1057 705/322 |
| 2015/0106234 A1 | 4/2015 | Kamdar et al. | |
| 2015/0106690 A1 | 4/2015 | Kamdar et al. | |
| 2015/0106725 A1 | 4/2015 | Kamdar et al. | |
| 2015/0113605 A1* | 4/2015 | Henderson | G06Q 50/01 726/4 |
| 2015/0142896 A1 | 5/2015 | Buchanan | |
| 2015/0156190 A1 | 6/2015 | Sanso et al. | |
| 2015/0205842 A1* | 7/2015 | Jain | G06Q 10/10 707/732 |
| 2015/0242817 A1* | 8/2015 | Srimushnam | G06Q 10/1053 705/319 |
| 2015/0248651 A1* | 9/2015 | Akutagawa | G06Q 10/1095 705/7.19 |

(56) References Cited

U.S. PATENT DOCUMENTS

| | | | | |
|---|---|---|---|---|
| 2015/0304437 | A1* | 10/2015 | Vaccari | G06F 16/9537 709/204 |
| 2015/0310029 | A1 | 10/2015 | Lei | |
| 2015/0317602 | A1* | 11/2015 | Rao | G06Q 10/1053 705/321 |
| 2015/0347534 | A1* | 12/2015 | Gross | H04L 51/046 707/722 |
| 2016/0005001 | A1* | 1/2016 | Muhammedali | G06Q 10/1053 705/319 |
| 2016/0055235 | A1* | 2/2016 | Zhang | G06F 16/3344 707/749 |
| 2016/0103837 | A1 | 4/2016 | Lee et al. | |
| 2016/0132832 | A1* | 5/2016 | Pinkovezky | H04L 63/08 705/319 |
| 2016/0132833 | A1* | 5/2016 | Obeid | G06F 17/2705 705/321 |
| 2016/0142549 | A1 | 5/2016 | Kalmstrom | |
| 2016/0162840 | A1* | 6/2016 | Roberts | G06Q 10/1053 705/321 |
| 2016/0314123 | A1 | 10/2016 | Ramachandran et al. | |
| 2016/0321693 | A1* | 11/2016 | Dabbiru | G06Q 30/0256 |
| 2017/0041296 | A1* | 2/2017 | Ford | H04W 12/02 |
| 2017/0098283 | A1 | 4/2017 | Rajan et al. | |
| 2017/0154314 | A1 | 6/2017 | Mones et al. | |
| 2017/0168996 | A1 | 6/2017 | Dou et al. | |
| 2017/0270484 | A1 | 9/2017 | Cengiz et al. | |
| 2017/0300565 | A1 | 10/2017 | Calapodescu et al. | |

OTHER PUBLICATIONS

"Applicant Initiated Interview Summary in U.S. Appl. No. 15/253,588", dated Aug. 3, 2018, 3 Pages.

"Non Final Office Action Issued in U.S. Appl. No. 15/253,588", dated Jul. 18, 2018, 16 Pages.

"Notice of Allowance Issued in U.S. Appl. No. 15/253,588", dated Sep. 28, 2018, 14 Pages.

"Amendment & Response to Non Final Office Action Issued in U.S. Appl. No. 15/410,525", dated Aug. 1, 2018, 15 Pages.

"Applicant Initiated Interview Summary in U.S. Appl. No. 15/410,525", dated Jun. 11, 2018, 1 Page.

"Non Final Office Action Issued in U.S. Appl. No. 15/410,525", dated May 3, 2018, 23 Pages.

"Non-Final Office Action Issued in U.S. Appl. No. 15/341,711", dated Dec. 13, 2018, 13 Pages.

"Final Office Action Issued in U.S. Appl. No. 15/410,525", dated Nov. 15, 2018, 30 Pages.

"Non-Final Office Action Issued in U.S. Appl. No. 15/499,554", dated Jan. 2, 2019, 18 Pages.

"Notice of Allowance Issued in U.S. Appl. No. 15/499,554", dated Feb. 7, 2019, 9 Pages.

"Non Final Office Action Issued in U.S. Appl. No. 15/410,525", dated Feb. 7, 2019, 21 Pages.

"Final Office Action Issued in U.S. Appl. No. 15/274,464", dated Sep. 4, 2019, 16 Pages.

"Non-Final Office Action Issued in U.S. Appl. No. 15/404,888", dated Sep. 5, 2019, 14 Pages.

"Non-Final Office Action Issued in U.S. Appl. No. 15/404,914", dated Sep. 12, 2019, 17 Pages.

"Non Final Office Action Issued in U.S. Appl. No. 15/411,816", dated Apr. 15, 2019, 41 Pages.

"Non-Final Office Action Issued in U.S. Appl. No. 15/410,525", dated Aug. 8, 2019, 22 Pages.

"Corrected Notice of Allowability Issued in U.S. Appl. No. 15/341,711" dated Aug. 14, 2019, 3 Pages.

"Applicant Initiated Interview Summary Issued in U.S. Appl. No. 15/410,525", dated Aug. 20, 2019, 3 Pages.

"Applicant Initiated Interview Summary Issued in U.S. Appl. No. 15/411,816", dated Aug. 27, 2019, 3 Pages.

"Final Office Action Issued in U.S. Appl. No. 15/404,888", dated Jul. 16, 2019, 13 Pages.

"Final Office Action Issued in U.S. Appl. No. 15/404,914" dated Jul. 16, 2019, 14 Pages.

"Corrected Notice of Allowability Issued in U.S. Appl. No. 15/341,711" dated Jul. 3, 2019, 3 Pages.

"Notice of Allowance Issued in U.S. Appl. No. 15/341,711", dated May 22, 2019, 15 Pages.

"Final Office Action Issued in U.S. Appl. No. 15/410,525", dated May 28, 2019, 23 Pages.

"Applicant-Initiated Interview Summary Issued in U.S. Appl. No. 15/410,525", dated Jun. 11, 2019, 3 Pages.

"Non Final Office Action Issued in U.S. Appl. No. 15/274,464", dated Feb. 25, 2019, 14 Pages.

"Non Final Office Action Issued in U.S. Appl. No. 15/404,888", dated Feb. 26, 2019, 16 Pages.

"Non Final Office Action Issued in U.S. Appl. No. 15/404,914", dated Feb. 25, 2019, 17 Pages.

"Notice of Allowance Issued in U.S. Appl. No. 15/274,464", dated Oct. 31, 2019, 13 Pages.

"Corrected Notice of Allowability Issued in U.S. Appl. No. 15/341,711", dated Oct. 2, 2019, 3 Pages.

"Applicant Initiated Interview Summary Issued in U.S. Appl. No. 15/404,888", dated Nov. 19, 2019, 3 Pages.

"Applicant Initiated Interview Summary Issued in U.S. Appl. No. 15/404,914", dated Nov. 19, 2019, 3 Pages.

"Final Office Action Issued in U.S. Appl. No. 15/410,525", dated Dec. 12, 2019, 25 Pages.

\* cited by examiner

MESSAGING SERVICE INTEGRATION WITH DEDUPLICATOR

PRIORITY CLAIM

This application claims priority under 35 U.S.C. § 119 to U.S. Provisional Patent Application Ser. No. 62/378,445, filed Aug. 23, 2016, and titled, "IDENTIFYING USER INFORMATION FROM A SET OF PAGES," which is incorporated herein by reference in its entirety. This application claims priority under 35 U.S.C. § 119 to U.S. Provisional Patent Application Ser. No. 62/382,155, filed Aug. 31, 2016, and titled, "MESSAGING SERVICE INTEGRATION WITH DEDUPLICATOR," which is incorporated herein by reference in its entirety.

RELATED APPLICATION

This application is related to U.S. patent application Ser. No. 15/253,588, titled "DEDUPLICATION AND DISAMBIGUATION," and filed on Aug. 31, 2016, which is incorporated herein by reference in its entirety. This application is related to U.S. patent application Ser. No. 15/341,711, titled "IDENTIFYING USER INFORMATION FROM A SET OF PAGES," and filed on Nov. 2, 2016, which is incorporated herein by reference in its entirety. This application is related to U.S. patent application Ser. No. 15/274,464, titled "APPLICANT TRACKING SYSTEM INTEGRATION," and filed on Sep. 23, 2016, which is incorporated herein by reference in its entirety.

TECHNICAL FIELD

The present disclosure generally relates to machines configured for deduplication of data stored in a data repository, including computerized variants of such special-purpose machines and improvements to such variants, and to the technologies by which such special-purpose machines become improved compared to other special-purpose machines that provide deduplication technology. In particular, the present disclosure addresses systems and methods for messaging (e.g., email) service integration with a deduplicator.

BACKGROUND

Deduplication of data stored in a data repository may be useful in multiple contexts. In one example, a person may combine multiple contact lists (e.g., an email contact list, a social network contact list, and a mobile phone contact list) and wish to remove duplicate entries. In another example, a team of recruiters may be prohibited (e.g., for legal, company policy or best practice reasons) from contacting candidates that the team has previously contacted during a time period (e.g., in the last six months). Thus, when composing a message to a potential candidate, the recruiter may wish to compare the candidate with previously contacted candidates to determine if the potential candidate has previously been contacted. As the foregoing illustrates, techniques for deduplication of data stored in a data repository and techniques for integrating a messaging service with a deduplicator may be desirable.

BRIEF DESCRIPTION OF THE DRAWINGS

Some embodiments of the technology are illustrated, by way of example and not limitation, in the figures of the accompanying drawings.

DETAILED DESCRIPTION

Overview

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

Some aspects of the subject technology address the problem in the computer arts of deduplication and disambiguation. According to some implementations, the solution to the problem of deduplication and disambiguation includes a server accessing, in a data repository, stored information about a first entity and stored information about a second entity. The data repository may be a database or may have any other structure. In some examples, the server reads a first record (of a first entity) and a second record (of a second entity, which may be identical to the first entity). Each record may comprise one or more fields. The server may then compare one or more fields of the first record and one or more fields of the second record to generate one or more expressiveness scores that is used to generate a probability or a score that the first record represents the same entity as the second record. As used herein, an "entity" may refer to a record storing information about the entity. The server provides, as a digital transmission (e.g., to another machine or to a different component of the server), an output representing the computed probability or score. In some cases, if the computed probability or score exceeds a threshold probability (e.g., 80% or 95%) or score, the server determines that the first entity and the second entity represent a common individual or organization based on the computed probability or score exceeding the threshold probability or score. The server combines, within the data repository, the first entity and the second entity into a single entity in response to determining that the first entity and the second entity, represent a common individual or organization.

As used herein, a data repository may include any data storage unit, for example, Random-Access Memory (RAM), a database, cloud storage, and the like. In some cases, the two entities being de-duplicated might reside in different data storage units. According to one mode of operation, one piece of information is inserted in the data repository (but does not yet reside in the data repository) and is de-duplicated against numerous potential matches already in the data repository. However, any amount of the information ranging from none to all of it may live in the data repository.

In some embodiments, a deduplicator is combined with a messaging service. In this context, when a user is composing a message to an entity, the user may be notified whether that user (or other users e.g., other members of a team of recruiters) has contacted the user previously. This may be useful, for example, in the employment recruiting context, where recruiters may spend much time determining if they, themselves, or other members of their team (which may include hundreds of members who are spread out geographically) have previously contacted a candidate (whom a recruiter now wishes to contact) via email, telephone, or social network message.

In example embodiments of the deduplicator being combined with a messaging service, a server determines that a first user from among a set of users is composing a message to an entity using a first contact information of the entity. The server determines that a second user from among the set of users previously contacted the entity using a second contact information of the entity, the second contact information being different from the first contact information. The server provides for display, within a graphical user interface (GUI), an indication that the second user has previously contacted the entity. In some cases, the indication is displayed within a sidebar of the GUI.

As used herein, the term "deduplication" may refer to, among other things, identifying entries referring to the same entity from a data repository. For example, if a data repository includes the following entities: (1) "John Sample," mobile phone 650-555-1212, and (2) "John Q. Sample," mobile phone 650-555-1212, a server may conclude that these entries are duplicates (due to similar name and same mobile phone number) and remove one of the duplicate entries or combine the entries.

As used herein, the term "disambiguation" may refer to, among other things, replacing ambiguous entries with full entries. For example, if a data repository includes the entities: (1) "John Sample," mobile phone 650-555-1212, and (2) "J. Sample," mobile phone 650-555-1212, a server may conclude, based on the common last name and mobile phone numbers, that the initial J represents John and replace "J" with "John."

Figure 1:
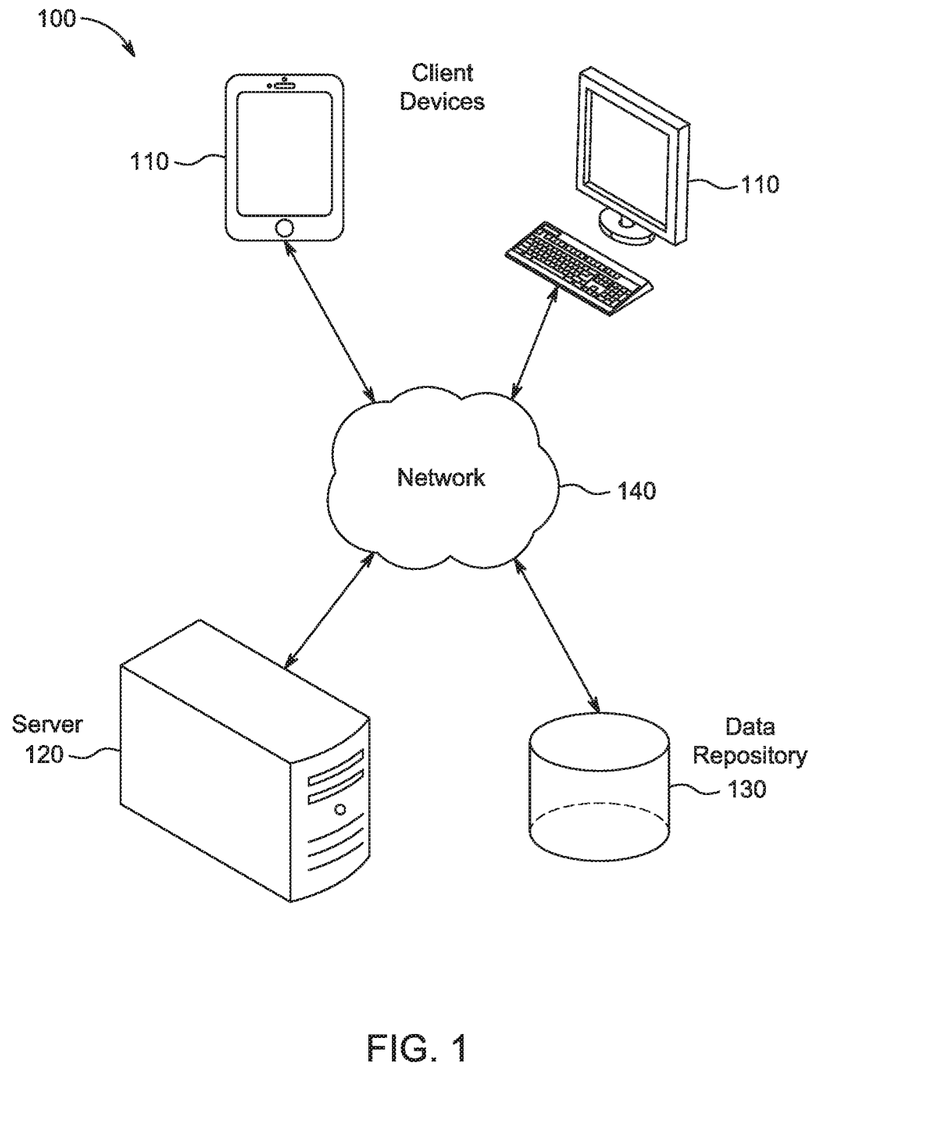
FIG. 1 illustrates an example network system, in accordance with some embodiments.

FIG. 1 illustrates an example network system 100, in accordance with some embodiments. As shown, the system 100 includes client devices 110, a server 120, and a data repository 130 connected to one another and capable of communicating with one another via a network 140. The network 140 may include one or more networks and may include one or more of the Internet, a wide area network (WAN), a local area network (LAN), a virtual private network (VPN), an intranet, and the like.

The subject technology may be implemented with multiple client devices 110. Each client device 110 may be a laptop computer, a desktop computer, a mobile phone, a tablet computer, a smart watch, a personal digital assistant (PDA), a digital music player, and the like. The client devices 110 may be used to add data to the data repository 130 and to access data stored in the data repository 130.

The data repository 130 may be implemented as a database or any other data storage unit. The data repository 130 stores a set of entities and information about each entity. The entity may represent a contact, such as an individual or an organization. The data repository 130 is described in more detail in conjunction with FIG. 2, below.

The server 120 is configured to apply deduplication and disambiguation to the data repository, for example, as set forth above. The server 120 is configured to integrate the deduplicator with a messaging service. More details of the operation of the server 120 are provided in conjunction with FIG. 3 and FIG. 5, below.

In one example, a machine is configured to carry out a method by having software code for that method stored in a memory that is accessible to the processor(s) of the machine. The processor(s) access the memory to implement the method. In another example, the instructions for carrying out the method are hard-wired into the processor(s). In yet another example, a portion of the instructions are hard-wired, and a portion of the instructions are stored as software code in the memory.

Figure 2:
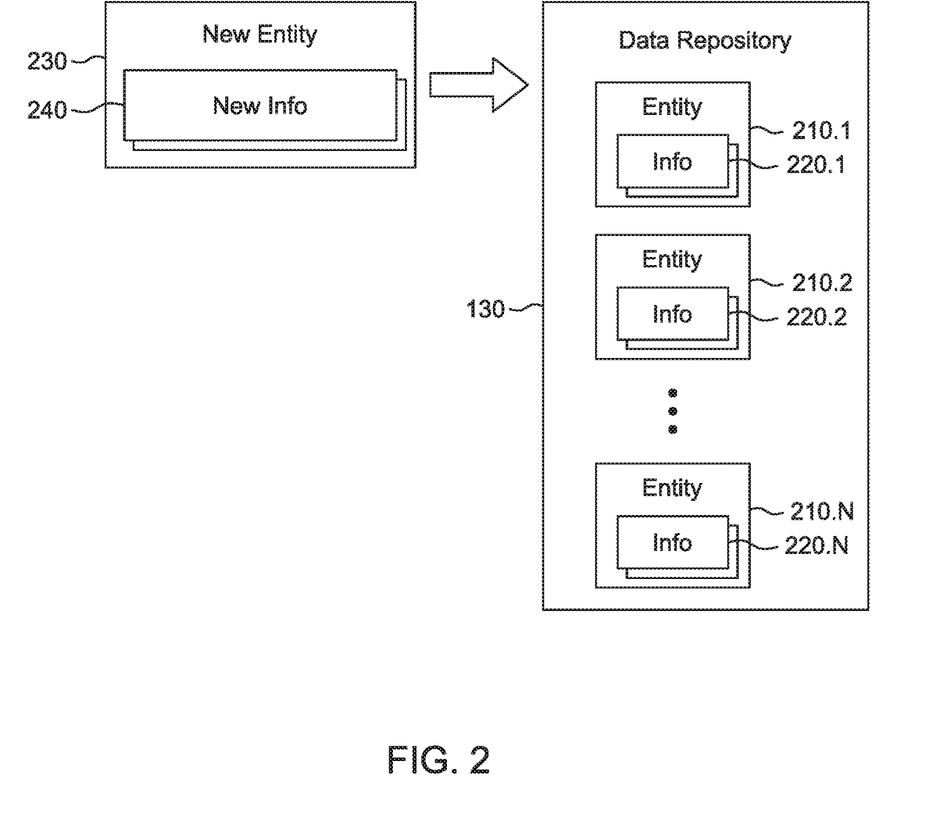
FIG. 2 is a block diagram illustrating an example of the data repository of FIG. 1, in accordance with some embodiments.

FIG. 2 is a block diagram illustrating an example of the data repository 130 of FIG. 1, in accordance with some embodiments. As shown, the data repository 130 stores information 220.1-220.N about multiple entities 210.1-210.N. Each entity $210.k$ (where k is a number between 1 and N) may be an individual or an organization. The information $220.k$ about the entity $210.k$ may include one or more of a first name, a last name, a telephone number, an email address, a postal address, a social networking link or handle, and the like. Other attributes in the information items $220.k$ may include employer(s), educational institution (s), and the like. The list of attributes provided here is not exhaustive. In some cases, one or more of the information items in the information $220.k$ may be missing (e.g., a name and a telephone number, but no email address, may be stored). The data repository 130 may correspond to a contact list of a user of an email service, a mobile phone, or an online contact storage service. Multiple information items $220.k$ may be stored for each entity $210.k$.

As shown in FIG. 2, each entity 210 includes information 220. The information 220 includes, for example, contact information and social networking information of a person represented by the entity. A more detailed example of the entity 210 is described in conjunction with FIG. 4, below.

In some cases, a new entity 230 (similar to entity 210) having new information 240 (similar to information 220) may be added to the data repository 130. For example, the data repository may store an online contact list, and a user of a client device 110 may decide to add a new entity 230 to his/her contact list, and to provide some new information 240 for the new entity.

In these cases, the server 120 may determine, using the techniques described herein, whether the new entity 230 represents a new individual or organization or an individual or organization that is already associated with one of the entities 210.1-N. In the latter case, the new entity may be combined with the one of the entities 210.1-N representing the same individual or organization.

Figure 3:
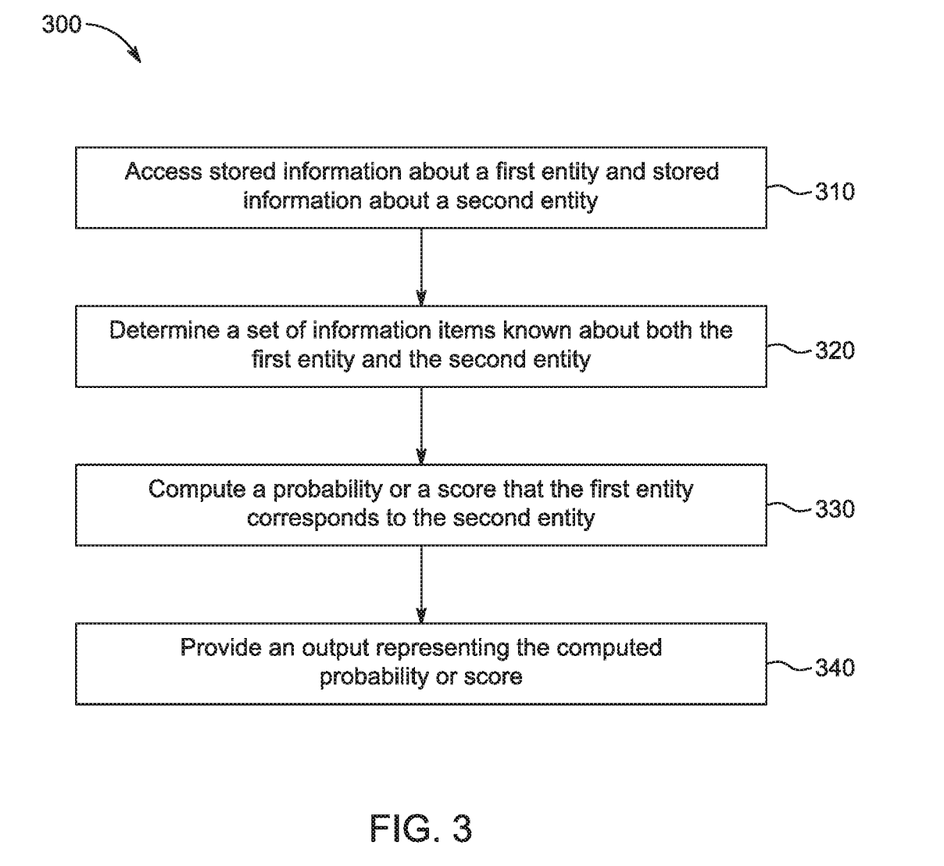
FIG. 3 is a flow chart illustrating an example method for identifying duplicate data, in accordance with some embodiments.

FIG. 3 is a flow chart illustrating an example method 300 for identifying duplicate data. After duplicate data is identified, the duplicate data may be combined into a single data entry. In some examples, the method 300 is implemented at the server 120. It should be noted that, if entities are combined, the server 120 (or another machine) retains a copy of the original record so that the decision to combine these entities may be revisited in the future as more information is acquired or as improvements/modification are made to the disambiguation techniques used. Combined entities and original source entities may be stored separately.

At operation 310, the server 120 accesses stored information about a first entity and stored information about a second entity. The stored information about the first entity and the second entity may be stored in the data repository 130. In some cases, the first entity is the new entity 230 being added to the data repository 130, and the second entity is one of the entities 210.k (where k is a number between 1 and N) in the data repository 130. In some cases, the first entity is an entity 210.m (where m is a number between 1 and N) in the data repository, and the second entity is another one of the entities 210.k in the data repository.

At operation 320, the server 120 determines, based on the accessed stored information about the first entity and the accessed stored information about the second entity, a set of information items known about both the first entity and the second entity. The information items may include (but is not limited to) one or more of a first name, a last name, a telephone number, an email address, a postal address, a social networking link or handle, and the like. The information about the first entity may be stored in information 240 (if the first entity is the new entity 230) or the information 220.m (if the first entity is the entity 210.m). The information about the second entity may be stored in information 220.k (if the second entity is the entity 210.k). In some cases, each information item has an information type. The information type may be (but is not limited to) one of a name type (e.g., first name, last name, and the like), a contact type (e.g., email address, telephone number, instant messenger screen name, social network handle, and the like), a business type (e.g., company name, industry, and the like), a geography type (e.g., street address, city, state, country, and the like), and the like.

In one example, the information items known about the first entity include a first name, an email address, and a telephone number. The information items known about the second entity include a first name, a last name, an email address, and a social networking link. In this example, the information items known about both the first entity and the second entity include the first name and the email address. In some cases, information item(s) may be converted into a normalized format using data normalization. For example, names, email addresses, and the like may be converted into a normalized format that recognizes, for example that "John@Example.com" and "john@example.com" represent the same email address and "617-5554234" and "+1 617 555 1234" represent the same telephone number. Data normalization may also include looking up in a database (or other data structure) that common names are associated with the same entity, for example "Ben" is a nickname for "Benjamin," and "IBM" and "International Business Machines" are the same. Furthermore, the database may also include historical information, such as the fact that Target-Company was acquired by Buyer-Company in June 2014 (and, therefore, a first entity that is named John Smith and worked for Buyer-Company in August 2014, and a second entity that is named John Smith and worked for Target-Company in July 2014, are likely the same).

At operation 330, the server 120 computes, based on the set of information items known about both the first entity and the second entity, a probability or a score that the first entity corresponds to the second entity (i.e., that the first entity and the second entity represent the same person or organization). The probability is computed by combining a set of computed expressiveness scores. An expressiveness score is computed from a value of a first information item and a value of a second information item (and, in some cases, values of other information items) from the set of information items. The expressiveness score indicates a confidence in whether the information items match or are in conflict with each other and the uniqueness of such a match in the case where the items match. The first information item may have a different information type from the second information item. For example, the first information item may be a first and last name, and the second information item may be an email address.

In some cases, one or the expressiveness scores corresponding to the value of the first information item and the value of the second information item represents a probability or score that the first entity corresponds to the second entity given that the first information item and the second information item are associated with both the first entity and the second entity. For example, in a given population (e.g., the population of the San Francisco Bay Area), the last name "Patel" may be fairly common and the first name "Isaac" may be fairly common. However, the full name "Isaac Patel" may be fairly uncommon (e.g., because one group of people is associated with the name "Isaac" and another group of people is associated with the name "Patel"). Thus, in this population "Isaac Patel" may have a high expressiveness score. In another example, the first name "Isaac" may be common and the last name "Cohen," may be common. However, the full name "Isaac Cohen" may have a lower expressiveness score because "Isaac" and "Cohen" are associated with the same sub-group of the population.

In other words, in a population, 1% of people may have the first name "Isaac," 1% of people may have the last name "Cohen," and 1% of people may have the last name "Patel." However out of the people named "Isaac," 5% may have the last name "Cohen" (multiplied to 0.05% of the whole population), while only 0.1% may have the last name "Patel" (multiplied to 0.001% of the whole population). Thus, people named "Isaac Patel" are rarer than people named "Isaac Cohen," resulting in a higher expressiveness score for "Isaac Patel," than for "Isaac Cohen."

In some examples, one of the expressiveness scores measures a codependence between the first information item and the second information item. For example, last names and email addresses may be highly codependent (e.g., someone with the last name Smith is likely to have the email address *smith@email-provider.com). Thus, a last name combined with an email address might not be very expressive. On the other hand, a social network handle that corresponds to a "pen name" or unusual nickname (e.g., "silver-bear" or "crazy-climber") combined with the last name Smith might have a higher expressiveness score, as such pen names/nicknames are not related to the last name.

In yet another example, one of the expressiveness scores may measure or be computed based on a frequency of occurrence of the first information item within the population or a frequency of occurrence of the second information item within the population. In one case, the expressiveness score is computed as the product of the frequency of occurrence of the first information item, the frequency of occurrence of the second information item, and a damping factor (e.g., 1.1). The damping factor may be used to account for the fact that the first information item may be positively correlated with the second information item. In this embodiment, correlation between the first information item and the second information item is not otherwise taken into account.

In some cases, the expressiveness score is inversely proportional to a population size (e.g., the population of the United States, the population of the State of California, the number of employees of a business, or the population of records/entities in a data repository). For example, an employee being associated with "ABC Pizza Shop," which has approximately 10 employees, is more expressive than an employee being associated with "XYZ Multinational Software Company," which has approximately 10,000 employees. It is more likely that two records that have the first name "Cindy," and the employer "ABC Pizza Shop," are the same, than that two records which have the first name "Cindy," and the employer "XYZ Multinational Software Company," are the same, as it is more likely that two of 10,000 people have the same first name, than that two out of 10 people have the same first name. In some cases, names or combinations of names that are rarer have a higher expressiveness score. For example, the first name "Brogan" is rarer than the first name "John," and thus corresponds to a higher expressiveness score. Covariant expressiveness is also taken into account. Covariant expressiveness may refer to the probability that two different information items are associated with the same entity. For example, the name "Xiaolu Patel" may have a very high expressiveness score as the first name "Xiaolu" is an East Asian name, whereas the last name "Patel" is an Indian name, and it is very unusual for a person to have a first and last name associated with such different geographies. Alternatively, the name "David Rosenberg" may have a lower expressiveness score (based on covariant expressiveness) because both the first name "David" and the last name "Rosenberg" are associated with the Jewish ethnicity. Databases of statistics are used in calculating expressiveness scores. Such databases may be acquired from commercial sources, governmental censuses, computed via entities in a data repository, and the like. An example record from such a database might look like {id:4, stdCompanyName:"XYZ, Corporation", numEmployees:10000} or {name:"McCann", count:676244, raceCounts:[white_non_hispanic:664324, hispanic:3212, black:8342, asian:321, american_indian:45]}.

At operation 340, the server 120 provides, as a digital transmission, an output representing the computed probability or score that the first entity corresponds to the second entity. In some cases, the server 120 determines that the computed probability or score exceeds a threshold probability (e.g., 80% or 95%) or a threshold score. The server 120 determines that the first entity and the second entity represent a common individual or organization based on the computed probability or score exceeding the threshold probability or score. In some implementations, the server combines the first entity and the second entity into a single entity in response to determining that the first entity and the second entity represent the common individual or organization. In this manner, duplicate entities from the entities 210.1-N of the data repository 130 may be combined into single entities.

In some cases, there may be multiple entities to deduplicate. For example, Entity A may include the name "Bill Clinton." Entity B may include the telephone number "212-555-1234." Entity C may include both "Bill Clinton" and "212-555-1234." The server 120 may conclude that Entity A and Entity B are the same based on Entity A corresponding to Entity C and Entity B corresponding to Entity C. In some cases, the probability or the score that the first entity corresponds to the second entity is computed initially, and then updated based on changes/improvements to the algorithm or based on additional information being added to the first entity or the second entity. Based on the updated probability or score, the server 120 may conclude that a first entity and second entity which were previously the same are now different, or vice versa. In some implementations, a graph of pairwise probabilities/scores for first entities and second entities is stored. When a probability/score in the graph changes, due to changes in the algorithm or changes in stored information about the entities, the server 120 may modify its conclusion about whether a first entity and a second entity represent the same entity.

The subject technology may have multiple different use cases. For example, the subject technology may be implemented to remove duplicate contacts from a contact list of an email account, a mobile phone, a personal digital assistant (PDA), an online contact storage unit, and the like.

In one example, the subject technology is implemented in a recruiting context, where an office of multiple recruiters is prohibited (e.g., due to legal, company policy, or best practice reasons) from contacting the same candidate multiple times within a given time period (e.g., six months or twelve month). In the recruiting context, the first entity represents an employment candidate whom one of the multiple recruiters wishes to contact. The data repository 130 stores, as the entities 210.1-N, a list of employment candidates whom the multiple recruiters have contacted previously during the given time period. The second entity is one of the entities stored in the data repository 130. The output representing the computed probability or score is a notification, presented within a graphical user interface (GUI), to the recruiter that the multiple recruiters from the office have likely (e.g., with a likelihood represented by the probability) previously contacted the employment candidate whom the recruiter wishes to contact. In some cases, a notification that the employment candidate has already been contacted may be shown without the probability or score, for example, if the probability or score exceeds a threshold value (e.g., 99.6%). A notification that the employment candidate may have been contacted, along with the probability or score, may be shown if the probability or score is within a certain range (e.g., between 70% and 99.6%) or if there is reason to believe that stored information about the employment candidate is inconsistent or incorrect.

In summary, the first entity represents an individual (e.g., employment candidate) whom one or more users (e.g., recruiters from a recruiting team, or a specific recruiter on the recruiting team) wish to contact. The second entity represents an individual (e.g., an employment candidate from a data repository storing previously-contacted candidates of the recruiting team) that the one or more users have previously contacted. The output representing the computed probability or score includes a notification that the one or more users have likely previously contacted the individual represented by the first entity, Other entities, different from individuals, can also be de-duplicated. For example, businesses that appear on multiple different services (e.g., a professional networking service, a mapping service, an employment search service, and the like) may be de-duplicated in a system that stored links to information about businesses.

Embodiments are described herein as being performed in a network system (e.g., system 100 of FIG. 1) with different machines carrying out different functions. However, the subject technology is not limited to network system. In some cases, a single machine may perform the functions of both the server and the data repository. This machine may be either a client device or a server. The single machine may either have or lack network connectivity. In some cases, the network 140 of FIG. 1 may be replaced with a hard-wired or direct wireless connection between two or more machines.

In this manner, this disclosure provides approaches for deduplication and disambiguation of data (e.g., a contact list) stored in a data repository, such as a database. According to some implementations, a server accesses, in a data repository, stored information about a first entity and stored information about a second entity. The data repository may be a database or may have any other structure. In some examples, the stored information includes one or more of a first name, a last name, a telephone number, an email address, a postal address, a social networking link or handle, and the like. The server determines, based on the accessed stored information about the first entity and the accessed stored information about the second entity, a set of information items known about both the first entity and the second entity. The server computes, based on the set of information items, a probability or score that the first entity corresponds to the second entity by computing an expressiveness score corresponding to a value of a first information item and a value of a second information item from the set of information items. The server provides an output representing the computed probability or score. In some cases, if the computed probability or score exceeds a threshold probability (e.g., 80% or 95%) or a threshold score, the server determines that the first entity and the second entity represent a common individual or organization based on the computed probability or score exceeding the threshold probability or score. The server combines, within the data repository, the first entity and the second entity into a single entity in response to determining that the first entity and the second entity represent a common individual or organization.

Figure 4:
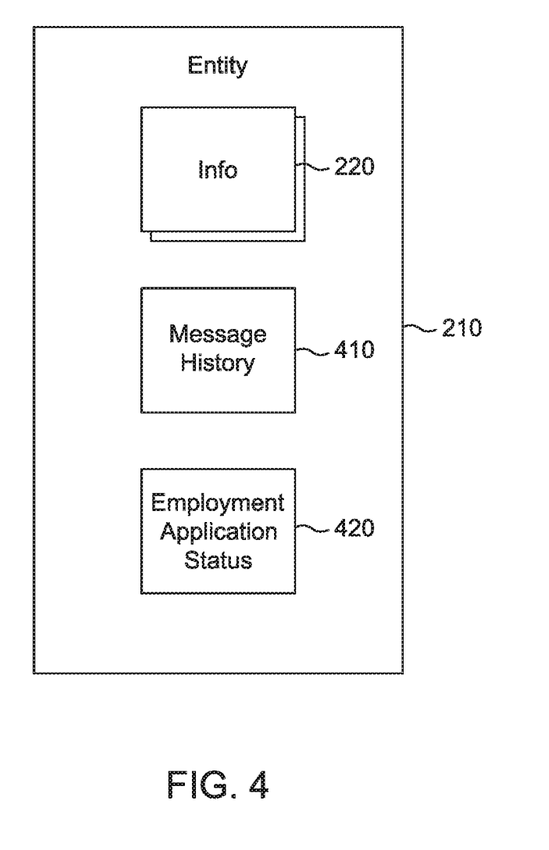
FIG. 4 is a block diagram illustrating an example of the entity of FIG. 2, in accordance with some embodiments.

FIG. 4 is a block diagram illustrating an example of the entity 210 of FIG. 2. As shown, the entity 210 includes information 220, a message history 410, and an employment application status 420. The information 220 about the entity 210 may include one or more of a first name, a last name, a telephone number, an email address, a postal address, a social networking link or handle, and the like. Other attributes in the information items 220 may include employer(s), educational institution(s), and the like. The list of attributes provided here is not exhaustive. The message history 410 includes a history of message(s) and other contact attempts (e.g., telephone calls or video conferences) sent to the entity 210 using the contact data in the information 220 by a set of users (e.g., a team of recruiters in a recruiting agency). When a user from the set of user contacts or is contacted by a person represented by the contact data in the information 220, the user provides information about the contacting, and this information is stored in the message history 410, In some cases, messages sent from or received by user(s) from the set of users to the person represented by the contact data are automatically loaded into the message history from the user(s)' messaging account(s) (e.g. email accounts, instant messaging accounts, messaging service within a social networking account, and the like). The employment application status 420 indicates a status of an employment application of the entity 210. For example, the employment application status 420 may indicate that the entity 210 has submitted an employment application to Company X, was rejected by Company X, is interviewing with Company X, received a job offer from Company X, accepted the job offer at Company X, started working at Company X, and the like.

Figure 5:
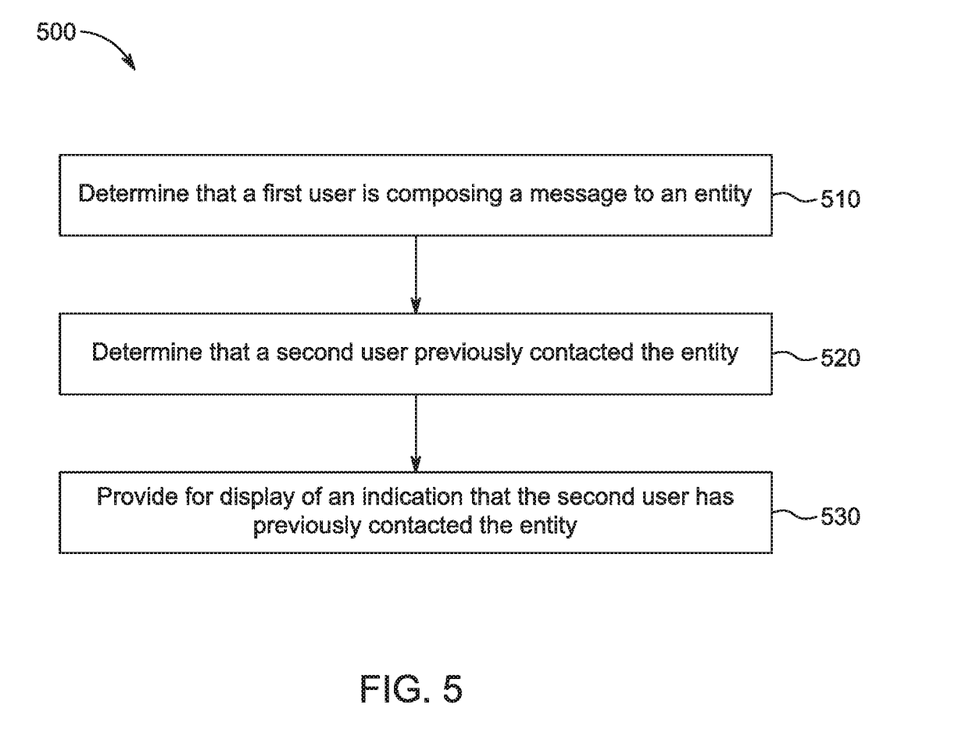
FIG. 5 is a flow chart illustrating an example method for indicating that a set of users has previously contacted an entity, in accordance with some embodiments.

FIG. 5 is a flow chart illustrating an example method 500 for indicating that a set of users has previously contacted an entity.

At operation 510, the server 120 determines that a first user from among a set of users (e.g., a team of recruiters) is composing a message to an entity 210 using a first contact information (e.g., from information 220) of the entity. For example, the first user may be composing an email message to the first entity. The server may determine that the first user is composing the message to the entity 210 by determining that the first user has typed an email address corresponding to the first contact information into a recipient address field of the email message. In one example, the message is an email message. Alternatively, the message may be a text message (e.g., using a short messaging service (SMS) or multimedia messaging service (MMS)), an instant message, a message within a social networking service, and the like. The set of users may correspond to a team of recruiters or to any other set of users.

At operation 520, the server 120 determines that a second user from among the set of users previously contacted the entity 210. The server 120 determines that the second user, in contacting the entity 210, used second contact information (e.g., from information 220) of the entity. The second contact information is different from the first contact information and may be of a different type than the first contact information. Example types may include: email, telephone call, mobile messaging service (e.g., SMS or MMS), social network message, instant message, video conference, or postal letter. Alternatively, the first contact information and the second information may be of the same type (e.g., both email addresses) but different values (e.g., the email addresses john.sample@example.com and jsample@abcPizzaShop.com). The determination that the second user previously contacted the entity 210 may be made based on the message history 410 of the entity 210. In some cases, the message history 410 is analyzed whenever the entity 210 is contacted. Alternatively, an indication that the second user previously contacted the entity 210 may be cached. In some cases, there may be a duration threshold (e.g., the last 6 months or the last 12 months) beyond which previous contacting is not considered or beyond which previous contacting is discounted.

In some examples, the server 120 determines that the first contact information and the second contact information are associated with the same entity via the method 300 or a similar method. In some cases, the server 120 may create a new entity (e.g., new entity 230 of FIG. 2) having the first contact information (e.g., in the new information 240) and compare this new entity with entities stored in the data repository 130.

At operation 530, the server 120 provides for display (e.g., within a GUI shown at the client device 110) of an indication that the second user has previously contacted the entity 210. Based on the information that the second user has previously contacted the entity 210, the first user may forego contacting the entity 210 or modify the message to the entity 210. In some cases, the GUI includes a sidebar, and the indication is displayed within the sidebar.

In some examples, the first user is different from the second user, the entity is a candidate for employment, and the set of users are a team of recruiters. However, alternative examples are possible. For instance, the entity may be a prospective customer or client of a business (e.g., a car dealership, a real estate brokerage, and the like) and the set of users may be salespersons from the business.

In some cases, if the entity is a candidate for employment, the server 120 provides for display (e.g., within the GUI shown at the client device 110) an indication of a status of an employment application of the entity (e.g., employment application status 420). The status of the employment application may be stored within an applicant tracking system (ATS), which may reside in the data repository 130.

In some cases, the server 120 provides for display (e.g., within the GUI shown at the client device 110) a message history (e.g., message history 410) between the entity 210 and the set of users. The message history may include one or more of: the subject of the message(s), the text of the message(s), the date(s)/time(s) of the message(s), indicia of response(s) to the message(s), and the like. The responses to the messages may be direct (e.g., a reply to an email) or indirect (e.g., a telephone call discussing the content of an email after receiving an email).

According to some examples, the first contact information has a first type. The second contact information has a second type. Each of the first type and the second type is one of: an email address, a telephone number, a postal address, a messaging address, a video conferencing address, a social network messaging address, and the like.

In this manner, this disclosure provides approaches for messaging service integration with a deduplicator. A server determines that a first user from among a set of users is composing a message to an entity using a first contact information of the entity. The server determines that a second user from among the set of users previously contacted the entity using a second contact information of the entity, the second contact information being different from the first contact information. The server provides for display, within a GUI, an indication that the second user has previously contacted the entity.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly; the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications, and so forth described in conjunction with FIGS. 1-3 are implemented in some embodiments in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

Example Machine Architecture and Machine-Readable Medium

Figure 6:
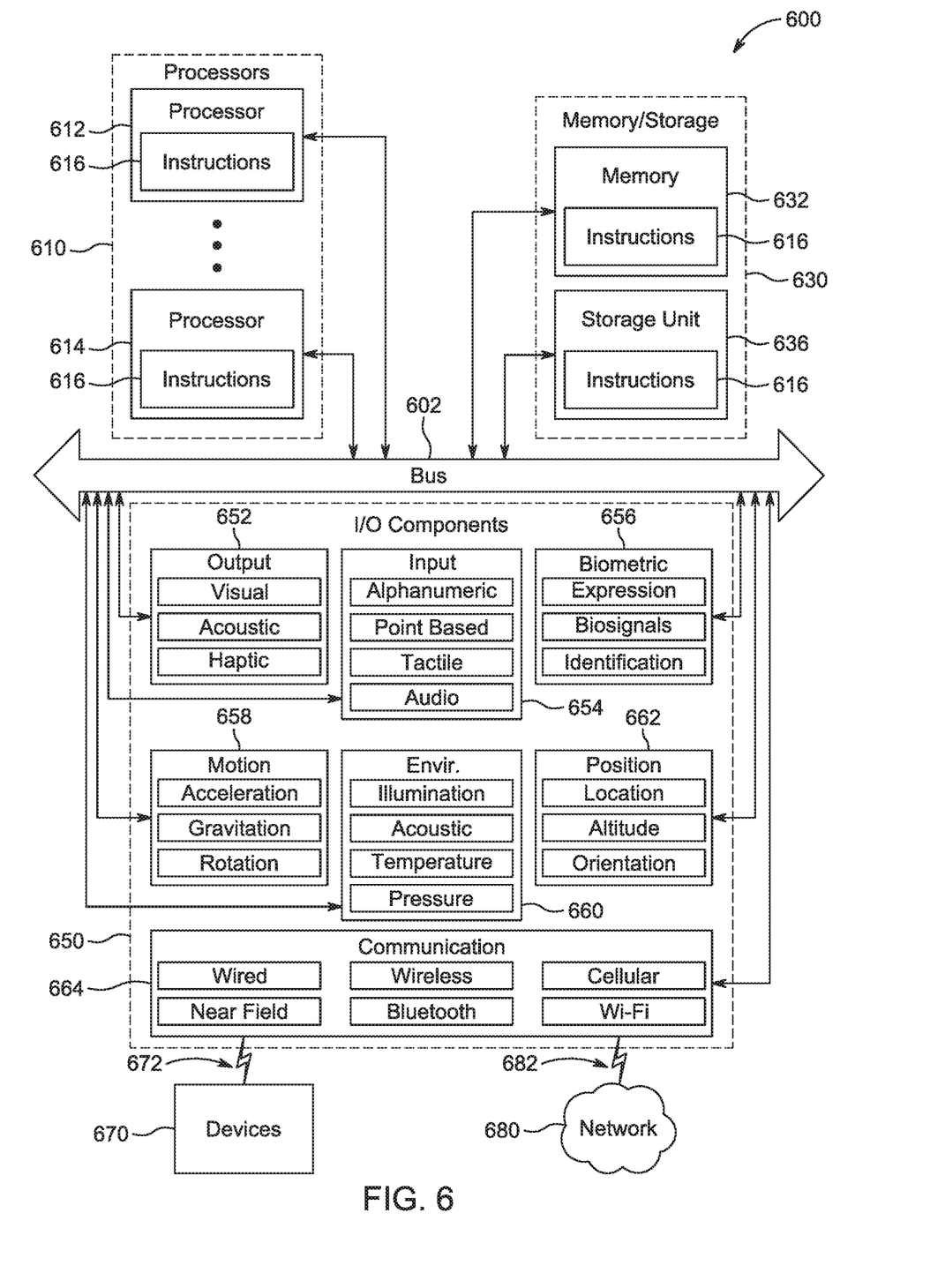
FIG. 6 is a block diagram illustrating components of a machine able to read instructions from a machine-readable medium and perform any of the methodologies discussed herein, in accordance with some embodiments.

FIG. 6 is a block diagram illustrating components of a machine 600, according to some example embodiments, able to read instructions from a machine-readable medium (e.g., a machine-readable storage medium) and perform any one or more of the methodologies discussed herein. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein may be executed. The instructions 616 transform the general, non-programmed machine into a particular machine programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 may include processors 610, memory/storage 630, and I/O components 650, which may be configured to communicate with each other such as via a bus 602. In an example embodiment, the processors 610 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 612 and a processor 614 that may execute the instructions 616. The term "processor" is intended to include multi-core processors that may comprise two or more independent processors (sometimes referred to as "cores") that may execute instructions contemporaneously. Although FIG. 6 shows multiple processors 610, the machine 600 may include a single processor with a single core, a single processor with multiple cores (e.g., a multi-core processor), multiple processors with a single core, multiple processors with multiples cores, or any combination thereof.

The memory/storage 630 may include a memory 632, such as a main memory, or other memory storage, and a storage unit 636, both accessible to the processors 610 such as via the bus 602. The storage unit 636 and memory 632 store the instructions 616 embodying any one or more of the methodologies or functions described herein. The instructions 616 may also reside, completely or partially, within the memory 632, within the storage unit 636, within at least one of the processors 610 (e.g., within the processor's cache memory), or any suitable combination thereof, during execution thereof by the machine 600. Accordingly, the memory 632, the storage unit 636, and the memory of the processors 610 are examples of machine-readable media.

As used herein, "machine-readable medium" means a device able to store instructions (e.g., instructions 616) and data temporarily or permanently and may include but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 616. The term "machine-readable medium" shall also be taken to include any medium, or combination of multiple media, that is capable of storing instructions (e.g., instructions 616) for execution by a machine (e.g., machine 600), such that the instructions, when executed by one or more processors of the machine (e.g., processors 610), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 650 may include a wide variety of components to receive input, provide output, produce output, transmit information, exchange information, capture measurements, and so on. The specific I/O components 650 that are included in a particular machine will depend on the type of machine. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion and the grouping is in no way limiting. In various example embodiments, the I/O components 650 may include output components 652 and input components 654. The output components 652 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth.

The input components 654 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 650 may include biometric components 656, motion components 658, environmental components 660, or position components 662, among a wide array of other components. For example, the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 658 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere or other components that may provide indications, measurements, or signals corresponding to a surrounding physical environment. The position components 662 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 650 may include communication components 664 operable to couple the machine 600 to a network 680 or devices 670 via a coupling 682 and a coupling 672, respectively. For example, the communication components 664 may include a network interface component or other suitable device to interface with the network 680. In further examples, the communication components 664 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 670 may be another machine or any of a wide variety of peripheral devices (e.g., a peripheral device coupled via a USB).

Moreover, the communication components 664 may detect identifiers or include components operable to detect identifiers. For example, the communication components 664 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, PDF417, Ultra Code, UCC RSS-2D bar code, and other optical codes); or acoustic detection components (e.g., microphones to identify tagged audio signals). In addition, a variety of information may be derived via the communication components 664, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 680 may be an ad hoc network, an intranet, an extranet, a virtual private network (VPN), a local area network (LAN), a wireless LAN (WLAN), a WAN; a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 680 or a portion of the network 680 may include a wireless or cellular network and the coupling 682 may be a Code Division Multiple Access (CDMA) connection, a Global System for Mobile communications (GSM) connection, or another type of cellular or wireless coupling. In this example, the coupling 682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide interoperability for Microwave Access (WiMAX), Long Term Evolution (LTE) standard, others defined by various standard-setting organizations, other long range protocols, or other data transfer technology.

The instructions 616 may be transmitted or received over the network 680 using a transmission medium via a network interface device (e.g., a network interface component included in the communication components 664) and utilizing any one of a number of well-known transfer protocols (e.g., HTTP). Similarly, the instructions 616 may be transmitted or received using a transmission medium via the coupling 672 (e.g., a peer-to-peer coupling) to the devices 670. The term "transmission medium" shall be taken to include any intangible medium that is capable of storing, encoding, or carrying the instructions 616 for execution by the machine 600, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   determining that a first user from among a set of users is composing a message to an entity using a first contact information of the entity;
   determining that a second user from among the set of users previously contacted the entity using a second contact information of the entity, the second contact information being different from the first contact information, the second user being different from the first user;
   determining that both the first contact information and the second contact information are associated with the same entity, wherein determining that both the first contact information and the second contact information are associated with the same entity comprises:
      accessing stored information about a first entity and stored information about a second entity, the stored information about the first entity comprising the first contact information and the stored information about the second entity comprising the second contact information;
      determining, based on the accessed stored information about the first entity and the accessed stored information about the second entity, a set of information items known about both the first entity and the second entity, each information item having an information type;
      computing, based on the set of information items, a probability or a score that the first entity corresponds to the second entity by computing one or more expressiveness scores corresponding to a value of a first information item and a value of a second information item from the set of information items, wherein at least one of the one or more expressiveness scores measures a codependence between the first information item and the second information item; and
      determining that the probability or the score that the first entity corresponds to the second entity is greater than a threshold probability or a threshold score; and
   providing for display to the first user, within a machine-generated graphical user interface (GUI), an indication that the second user has previously contacted the entity.

2. The method of claim 1, wherein the entity is a candidate for employment, and wherein the set of users comprises a team of recruiters.

3. The method of claim 2, further comprising:
   providing for display, within the GUI, an indication of a status of an employment application of the entity, the status of the employment application being stored within an applicant tracking system (ATS).

4. The method of claim 1, further comprising:
   providing for display, within the GUI, a message history of messages between the entity and the set of users.

5. The method of claim 1, wherein the first contact information has a first type, and wherein the second contact information has a second type different from the first type, wherein each of the first type and the second type is one of: an email address, a telephone number, a postal address, a messaging address, a video conferencing address, and a social network messaging address.

6. The method of claim 1, wherein at least one of the one or more expressiveness scores measures a frequency of occurrence of the first information item within a population, or a frequency of occurrence of the second information item within the population.

7. The method of claim 1, wherein determining that the first user is composing the message to the entity using a first contact information of the entity comprises:
   determining that the first user has typed an email address corresponding to the first contact information into a recipient address field of an email message.

8. The method of claim 1, wherein determining that the second user previously contacted the entity is based on an entity record of the entity, the entity record storing plural contact information items of the entity, including the first contact information and the second contact information, and a message history of messages between the set of users and the entity, the entity record being stored in a data repository.

9. The method of claim 1, wherein determining that both the first contact information and the second contact information are associated with the same entity comprises:
   determining a probability or a score that the first contact information and the second contact information are associated with the same entity;
   if the determined probability or the determined score that the first contact information and the second contact information are associated with the same entity is within a predefined range: displaying, within the GUI, the determined probability or the determined score; and if the determined probability or the determined score that the first contact information and the second contact information are associated with the same entity is not within the predefined range: forgoing displaying the determined probability or the determined score.

10. A non-transitory machine-readable medium storing instructions which, when executed by one or more processors of a machine, cause the machine to:

determine that a first user from among a set of users is composing a message to an entity using a first contact information of the entity;

determine that a second user from among the set of users previously contacted the entity using a second contact information of the entity, the second contact information being different from the first contact information, the second user being different from the first user;

determining that both the first contact information and the second contact information are associated with the same entity, wherein determining that both the first contact information and the second contact information are associated with the same entity comprises:

accessing stored information about a first entity and stored information about a second entity, the stored information about the first entity comprising the first contact information and the stored information about the second entity comprising the second contact information;

determining, based on the accessed stored information about the first entity and the accessed stored information about the second entity, a set of information items known about both the first entity and the second entity, each information item having an information type;

computing, based on the set of information items, a probability or a score that the first entity corresponds to the second entity by computing one or more expressiveness scores corresponding to a value of a first information item and a value of a second information item from the set of information items, wherein at least one of the one or more expressiveness scores measures a codependence between the first information item and the second information item; and determining that the probability or the score that the first entity corresponds to the second entity is greater than a threshold probability or a threshold score; and provide for display to the first user, within a machine-generated graphical user interface (GUI), an indication that the second user has previously contacted the entity.

11. The machine-readable medium of claim 10, wherein the entity is a candidate for employment, and wherein the set of users comprises a team of recruiters.

12. The machine-readable medium of claim 11, further storing instructions which, when executed by the one or more processors of the machine, cause the machine to:

provide for display, within the GUI, an indication of a status of an employment application of the entity, the status of the employment application being stored within an applicant tracking system (ATS).

13. The machine-readable medium of claim 10, further storing instructions which, when executed by the one or more processors of the machine, cause the machine to:

provide for display, within the GUI, a message history of messages between the entity and the set of users.

14. The machine-readable medium of claim 10, wherein the first contact information has a first type, and wherein the second contact information has a second type different from the first type, wherein each of the first type and the second type is one of: an email address, a telephone number, a postal address, a messaging address, a video conferencing address, and a social network messaging address.

15. The machine-readable medium of claim 10, wherein at least one of the one or more expressiveness scores measures a frequency of occurrence of the first information item within a population, or a frequency of occurrence of the second information item within the population.

16. A system comprising:

one or more processors; and a memory storing instructions which, when executed by the one or more processors, cause the one or more processors to:

determine that a first user from among a set of users is composing a message to an entity using a first contact information of the entity;

determine that a second user from among the set of users previously contacted the entity using a second contact information of the entity, the second contact information being different from the first contact information, the second user being different from the first user;

determining that both the first contact information and the second contact information are associated with the same entity, wherein determining that both the first contact information and the second contact information are associated with the same entity comprises:

accessing stored information about a first entity and stored information about a second entity, the stored information about the first entity comprising the first contact information and the stored information about the second entity comprising the second contact information;

determining, based on the accessed stored information about the first entity and the accessed stored information about the second entity, a set of information items known about both the first entity and the second entity, each information item having an information type;

computing, based on the set of information items, a probability or a score that the first entity corresponds to the second entity by computing one or more expressiveness scores corresponding to a value of a first information item and a value of a second information item from the set of information items, wherein at least one of the one or more expressiveness scores measures a codependence between the first information item and the second information item; and determining that the probability or the score that the first entity corresponds to the second entity is greater than a threshold probability or a threshold score; and provide for display to the first user, within a machine-generated graphical user interface (GUI), an indication that the second user has previously contacted the entity.

17. The system of claim 16, wherein the entity is a candidate for employment, and wherein the set of users comprises a team of recruiters.

18. The system of claim 17, the memory further storing instructions which, when executed by the one or more processors, cause the one or more processors to:

provide for display, within the GUI, an indication of a status of an employment application of the entity, the status of the employment application being stored within an applicant tracking system (ATS).

* * * * *